United States Patent
Hamdani et al.

(10) Patent No.: US 8,976,084 B2
(45) Date of Patent: Mar. 10, 2015

(54) PORTABLE AUGMENTED-REALITY HEAD-UP DISPLAY DEVICE

(75) Inventors: Rachid Hamdani, Maisons Alfort (FR); Zile Liu, Epinay sur Orge (FR)

(73) Assignee: Laster, Gif sur Yvette Cedex (FR)

( * ) Notice: Subject to any disclaimer, the term of this patent is extended or adjusted under 35 U.S.C. 154(b) by 643 days.

(21) Appl. No.: 13/147,611

(22) PCT Filed: Jan. 29, 2010

(86) PCT No.: PCT/FR2010/050142
§ 371 (c)(1),
(2), (4) Date: Oct. 20, 2011

(87) PCT Pub. No.: WO2010/089495
PCT Pub. Date: Aug. 12, 2010

(65) Prior Publication Data
US 2012/0026071 A1 Feb. 2, 2012

(30) Foreign Application Priority Data
Feb. 3, 2009 (FR) ..................................... 09 00449

(51) Int. Cl.
*G09G 5/00* (2006.01)
*G02B 27/01* (2006.01)
(52) U.S. Cl.
CPC ................. *G02B 27/0172* (2013.01)
USPC .................................. 345/7; 345/8; 359/630
(58) Field of Classification Search
CPC .. G02B 27/0101; G02B 27/01; G02B 27/017; G02B 27/0172; G02B 2027/0132; G09G 3/003; H04N 13/0497; H04N 13/0285
USPC ................................... 345/7–9; 359/629–631
See application file for complete search history.

(56) References Cited

U.S. PATENT DOCUMENTS

| | | | |
|---|---|---|---|
| 4,761,056 A | 8/1988 | Evans et al. | |
| 6,104,431 A * | 8/2000 | Inoue et al. | 348/333.01 |
| 6,122,101 A * | 9/2000 | Tanijiri et al. | 359/407 |
| 6,239,915 B1 * | 5/2001 | Takagi et al. | 359/629 |
| 6,252,728 B1 * | 6/2001 | Togino | 359/834 |
| 6,342,871 B1 * | 1/2002 | Takeyama | 345/7 |
| 7,637,617 B2 | 12/2009 | Liu et al. | |
| 2001/0010598 A1 | 8/2001 | Aritake et al. | |

FOREIGN PATENT DOCUMENTS

| | | |
|---|---|---|
| FR | 2 866 123 | 8/2005 |
| WO | 94/14152 | 6/1994 |

OTHER PUBLICATIONS

International Search Report dated Dec. 23, 2010, corresponding to the PCT application.

* cited by examiner

*Primary Examiner* — Kimnhung Nguyen
(74) *Attorney, Agent, or Firm* — Young & Thompson

(57) ABSTRACT

A portable optical device (104) for transmitting an image to the eye (6) of an observer, includes: a display (1) disposed on the same side of the observer's head (7) as the eye, so as to emit the image in front of the observer's head; an ocular dioptric surface (3); and redirection elements (4, 5, 8, 9) for guiding the image towards the dioptric surface. The device is disposed such that the image strikes the dioptric surface (3) originating from the side of the nose in relation to the eye (6) and the dioptric surface (3) then reflects the image towards the eye (6). Such a device is particularly suitable for the production of glasses that can be used to display a virtual or augmented reality.

20 Claims, 2 Drawing Sheets

PORTABLE AUGMENTED-REALITY HEAD-UP DISPLAY DEVICE

BACKGROUND OF THE INVENTION

Figure 1:
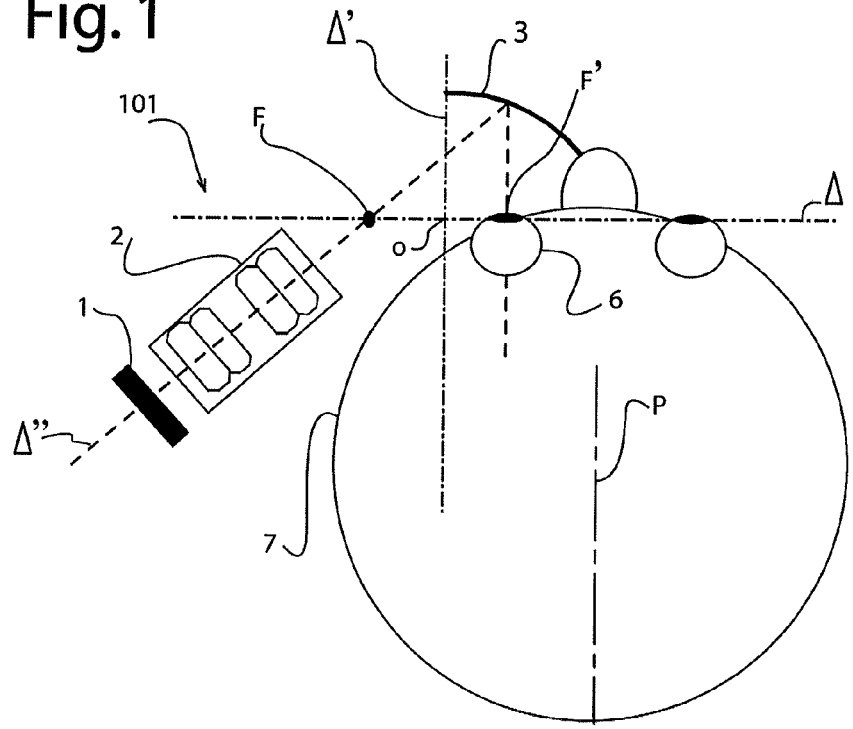

The present invention concerns a head-up display which can be used for augmented reality.

More precisely, it is the objective of the invention to improve the spatial arrangement of head-up display devices in order to provide significant improvements in terms of bulk, stability and pleasing design.

DESCRIPTION OF THE RELATED ART

Prior art methods for creating retinal images for visors or head-up displays are systematically based on one same spatial arrangement of the device, independently of the observer's morphology.

Some of these prior art devices adapted to be worn on a user's head generally comprise a frame, a light display, one or more groups of lenses, optionally one or more side fold mirrors and a dioptric assembly. They are arranged such that they are able to follow the lateral contour of the observer's head along a substantially horizontal plane passing through the ears and eyes in order to be as close as possible to the volume of a pair of conventional eyeglasses.

Patent FR 2 866 123 describes a method using the stigmatism of the two foci of a substantially elliptical refracting surface and describes an example of said device or spatial arrangement of the optical system adapted to the contour of the observer's head in a substantially horizontal plane.

In this patent, the device comprises a light display, at least one group of lenses, a side fold mirror, an ocular dioptric surface and cooperates with the observer's eye to form a retinal image. The light display, for each point source, emits a light beam that is reflected and refracted on the different parts of the device for the final forming of an image of the display on the retina of the observer's eye. It is noted that the central optical path i.e. the path followed by the centre of the image from the display to the observer's eye, passes in the vicinity of the foci of the ocular dioptric surface.

In relation to one side of the observer's head, the arrangement is the following:

the light display is arranged at the height of the user's ear and emits an image whose centre travels along the central optical path, at least one group of corrective lenses is arranged along the central optical path in the region of the temple of the observer's head, beyond, along the central optical path, a side fold mirror is arranged on the side of the head and slightly forwardly of the observer's eye, in order to fold the central optical path towards the ocular dioptric surface arranged before the observer's eye, so that the central optical path is then reflected by the ocular dioptric surface towards the observer's eye in order to conjugate the image on the retina.

The parts of the device together form an optical block in which all the parts are fixed in space each relative to one another and positioned in relation to the observer's head so that the central optical path is able to be oriented the closest possible to a direction perpendicular to the major axis of the ellipse.

It is also noted that the central optical path follows an optical pathway assumed to be on one same geometric plane.

However, it is ascertained that with this type of configuration in which the display is positioned on the side of the head, the ocular dioptric surface is itself oriented at a very open angle towards the outside, which largely distances one of its ends from the observer's head.

Said arrangement has disadvantages in terms of bulk, stability and design for implementing a portable device close to a conventional pair of glasses.

In the device of patent FR 2 866 123 in particular, since the eye is in the vicinity of one of the foci, the other focus must always be located on the outer side of the eye. This form of organisation is imposed since the choice of symmetrical inversion of the foci is impossible on account of the presence of the observer's head which causes obstruction.

SUMMARY OF THE INVENTION

The objective of the invention is to eliminate these disadvantages and to bypass the problems raised by head-up display devices whose source is placed on the side of the head, in particular by proposing a device more adapted to the requirements of stability, pleasing design and least bulk.

To achieve this objective, the invention proposes positioning the ocular dioptric surface in a manner that is best adapted to the morphology of the observer's head. To do so, it uses a new configuration of the central optical path along its pathway from the display to the observer's eye. In addition, the invention proposes adjustment means for the device.

According to the invention said portable optical device for transmitting an image to an eye of the observer of the image is characterized in that it comprises:

a display arranged on a first side of the observer's head and emitting the image substantially forwardly of the said head along an optical path, the first side being the same side as the eye;

an ocular dioptic surface;

redirecting means to guide the image between the display and the ocular dioptric surface.

The device is arranged so that the image originating from the side of the nose, in relation to the eye, strikes the ocular dioptric surface, the said dioptric surface then reflecting the said image in the direction of the said eye of the observer.

The portable optical device for transmitting an image to an eye of an observer of the image can also be characterized in that it comprises:

a display arranged on a first side of the observer's head and emitting the image substantially forwardly of the head along an optical path, the first side being the same as the side of the eye;

an ocular dioptric surface of substantially elliptical shape, the major axis of the ellipse being substantially transversal in relation to the observer's head;

the device being arranged so that the centre of the pupil of the eye is intended to be arranged substantially on a first focus of the dioptric surface, the second focus of the dioptric surface being arranged beyond the eye in relation to the first side of the head, in the direction of the second side of the observer's head;

the device further comprising redirecting means for guiding the image between the display and the dioptric surface so that the central optical path is reflected by the dioptric surface substantially towards the rear substantially in the direction of the first focus.

Advantageously, the device further comprises at least one group of lenses arranged downstream of the display and upstream of the redirecting means.

In one particular embodiment, the redirecting means comprise a side fold mirror provided to reflect the image transversally in the direction of the second side, and a back-inverting mirror arranged to redirect the image derived from the side fold mirror in the direction of the dioptric surface. The side fold mirror may be an integral part of the dioptric surface. The back-inverting mirror is advantageously provided so that it is positioned in the immediate vicinity of the upper part of the nose, substantially at the height of the eye, between the eye and the nose of the observer, more particular in a so-called "blind" spot.

Advantageously the device may also comprise two decentring mirrors arranged upstream of the side fold mirror, the first decentring mirror being arranged so that it reflects laterally the image derived from the display, transversally in the direction of the second side of the observer's head, and the second decentring mirror being arranged to reflect the image derived from the first decentring mirror substantially towards the front in the direction of the side fold mirror. Preferably, the second decentring mirror is designed so that it is positioned in the vicinity of the temple.

At least one of the mirrors forming the redirecting means may have a shape, independently of that of another of the mirrors, that is substantially elliptical, planar, concave, convex or aspherical and capable at least of attenuating a distortion of the image seen by the observer.

Adjustment means capable of adapting the optical path to the morphology of the observer may advantageously be provided.

Two devices according to the invention, each for a respective eye of the observer, can together form a binocular device, in particular for relief viewing.

A device according to the invention may comprise a carrier structure of eyeglass structure type, or a carrier structure of head-set type.

BRIEF DESCRIPTION OF THE DRAWING FIGURES

Figure 2:
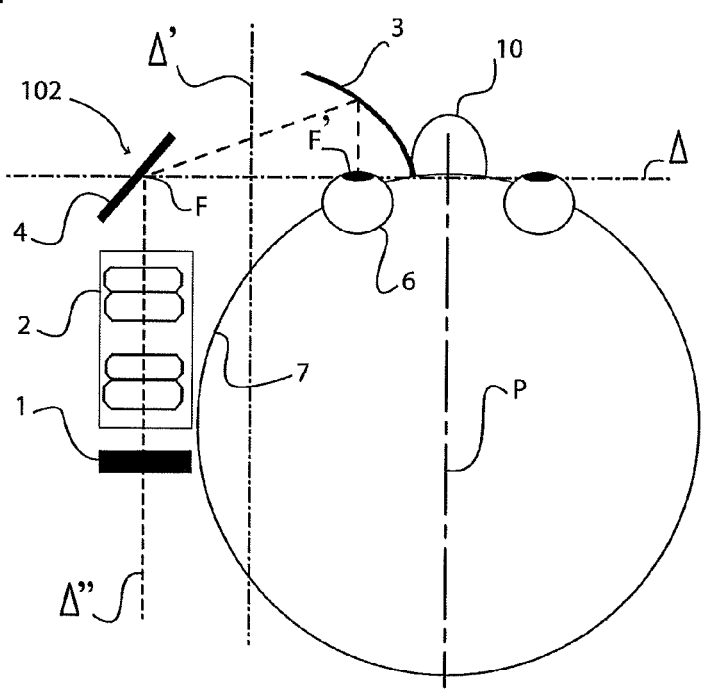
Figure 3:
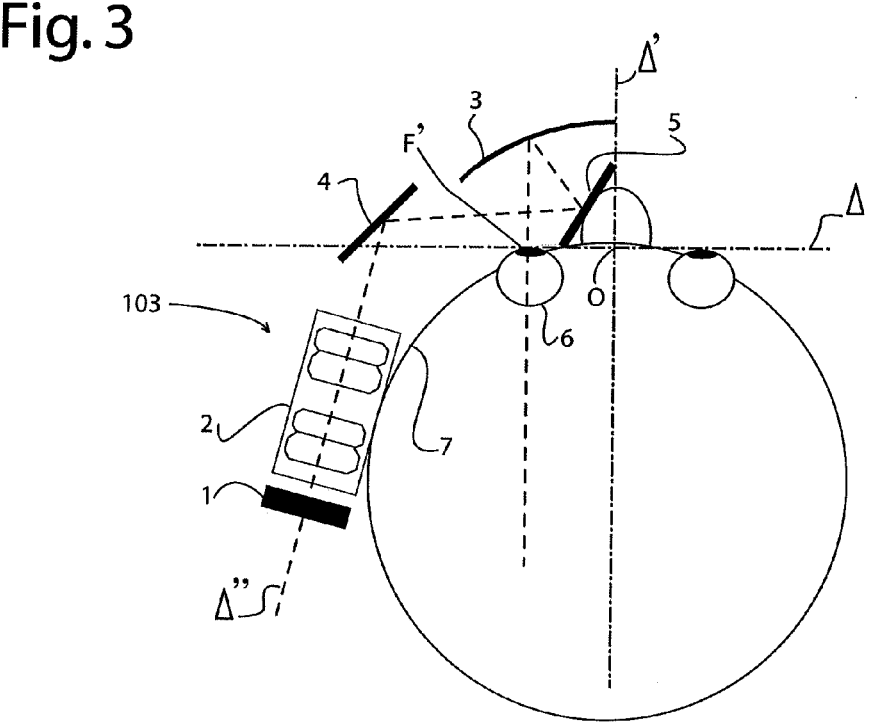
Figure 4:
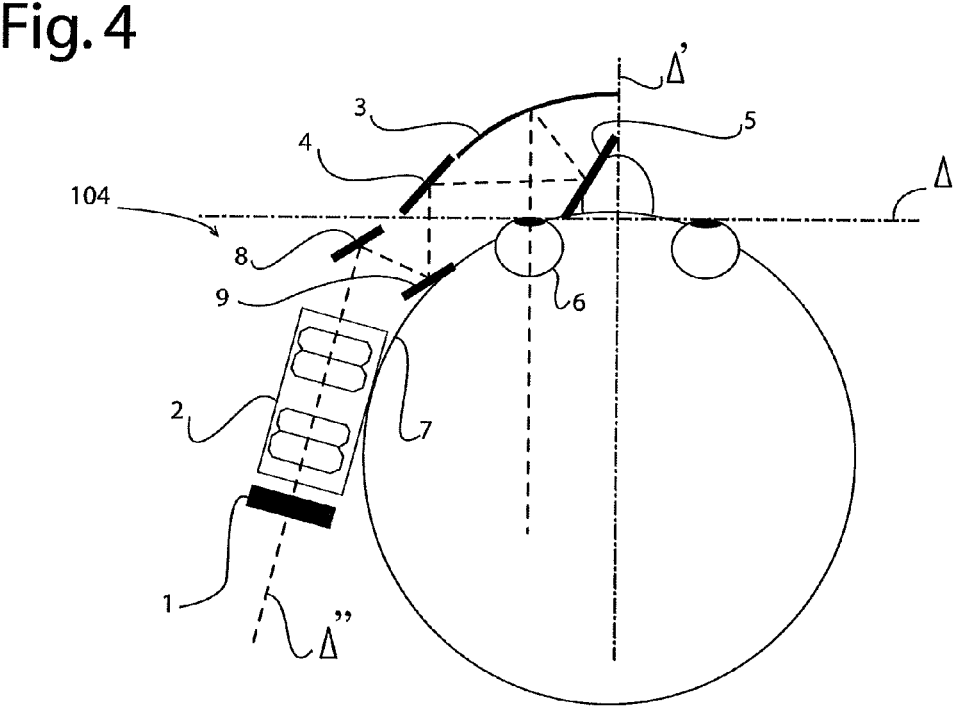

Several embodiments of the invention are described below as non-limiting examples, with reference to the appended drawings in which:

FIG. 1 illustrates a first embodiment of a prior art device which does not use folding of the optical path by a side fold mirror, FIG. 2 illustrates a second embodiment of a prior art device using folding of the optical path by a side fold mirror, FIG. 3 illustrates a first embodiment of a device according to the invention, FIG. 4 illustrates a second embodiment of a device according to the invention.

DETAILED DESCRIPTION OF THE INVENTION

All the figures are schematic illustrations from above the head of a user or observer of each device. The left side of the observer is the left side in each figure.

In all the figures, identical references designate parts or elements of parts having identical or similar functions.

The figures refer to a device cooperating with the left eye of an observer. A device may be symmetrically provided to cooperate with the right eye of an observer. A device according to the invention may also comprise both a device cooperating with the left eye and a device cooperating with the right eye of the observer.

In the description the term eye essentially designates the centre of the pupil.

FIG. 1 illustrates an optical device 101 of the prior art, based on a method using the stigmatism of two foci of a substantially elliptical dioptric surface. The device, in the order of the optical pathway, chiefly consists of:

a light display 1;
lenses 2; and
an ocular dioptric surface 3 of substantially elliptical shape represented by a portion of ellipse defined by its major axis Δ, its small axis Δ', its centre O and its two foci F and F' located on the major axis Δ, either side of the centre O, as a function of the eccentricity E of the ellipse.

In the figures, the axes Δ, Δ' of the dioptric surface 3 are shown as dot-dashed lines and the central optical path Δ" is shown as a dotted line.

In the example illustrated in FIG. 1, the device 101 is designed to cooperate with the observer's left eye 6. It is arranged on the left side of the observer's head 7. In addition, the major axis Δ passes symmetrically through the two eyes of the observer and it is therefore perpendicular to a median plane P of the head 7.

The light display 1 diffuses an image whose pathway is represented by a central optical path Δ". The lenses 2 are aligned and centred on the central optical path Δ". The central optical path Δ" passes through one F of the foci of the dioptric surface then, after being reflected on said dioptric surface 3, through the other focus F'. The observer's eye 6 is approximately aligned and centred on the central optical path Δ" in the vicinity of the focus F'.

The spatial arrangements of the parts of device 101 in relation to the central optical path Δ", on which they are aligned and centred, are inherent in the arrangement of the central optical path Δ", which necessarily passes through the foci F and F'. It is also ascertained that to observe this arrangement logic, the ocular dioptric surface 3 does not follow the periphery of the observer's head at the height of the eye as does a conventional pair of spectacles. Therefore the centre O of the dioptric surface is located largely outside, on the left of the left eye 6.

In addition the part 1, 2 of the device upstream of the focus F moves significantly away from the left side of the observer's head 7 over the distance between the focus F and the display 1. This positioning of the device 101 in relation to the observer's head 7 makes the device laterally bulky and of scarcely pleasing design.

The device 102 illustrated in FIG. 2 has more reduced lateral bulk than the device in FIG. 1. To reduce this bulkiness a side fold mirror 4 is arranged on the central optical path Δ" in the vicinity of the focus F so that it is possible upstream of the mirror 4 to fold or direct the central optical path Δ" substantially parallel to the median plane P and perpendicular to the major axis Δ. Therefore the device 102 in the order of the optical pathway is formed of:

a light display 1;
two groups of lenses 2;
a side fold mirror 4 of planar, concave or convex shape; and
an ocular dioptric surface 3 of substantially elliptical shape represented by a portion of ellipse E defined by its major axis Δ, its small axis Δ', its centre O and its two foci F and F' located on the major axis Δ either side of the centre O, as a function of the eccentricity E of the ellipse.

The light display 1 diffuses an image whose pathway is represented by a central optical path Δ". The lenses 2 are aligned and centred on the central optical path Δ". The side fold mirror 4 is arranged in the vicinity of the focus F so that it reflects the central optical path Δ" at a chosen angle in the direction of the ocular dioptric surface 3, so that the central optical path is then reflected in the direction of the observer's eye, substantially perpendicular to the major axis Δ. The observer's eye 6 is approximately aligned and centred on the central optical path Δ" in the vicinity of the focus F'.

In this configuration the bulkiness is significantly reduced since the central optical path Δ" is folded back along the side of the observer's head 7.

It is to be noted that the side fold mirror 4 in the example in FIG. 2 is positioned in the immediate vicinity of the focus F on which it can be directed. The positioning thereof, so close to the focus F, is made necessary by the fact that it can offer a surface of minimum reflection.

However the side fold mirror 4 can be arranged elsewhere on the central optical central path Δ" downstream or upstream of the focus F according to the needs of the optical design.

A description will now be given with reference to FIGS. 3 and 4 of two embodiments of a device according to the invention, in how they differ from the previously illustrated prior art.

FIG. 3 is an illustration of a first embodiment of a device according to the invention. The device 103 in FIG. 3, in the order of the optical pathway, is formed of:
- a light display 1;
- two groups of lenses 2;
- a side fold mirror 4;
- a back-inverting mirror 5; and
- an ocular dioptric surface 3 of substantially elliptical shape.

The light display 1 diffuses an image whose pathway is represented by a central optical path Δ". The lenses 2 are aligned and centred on the central optical path Δ". The side fold mirror 4 is arranged laterally in the vicinity of the observer's eye 6, in front of the observer's temple, and it reflects the central optical path Δ" at a chosen angle in the direction of the back-inverting mirror 5. The back-inverting mirror 5 is arranged in the region of the upper part of the observer's nose 10 on the right of and at the height of the left eye 6 and again reflects the central optical path Δ" towards the ocular dioptric surface 3. The mirrors are arranged such that the central optical path is then reflected by the dioptric surface in the direction of the observer's eye 6 substantially perpendicular to the major axis Δ. The observer's eye 6 i.e. the centre of the pupil of the eye is approximately aligned and centred on the central optical path Δ" in the vicinity of the focus F'.

According to the new optical scheme of the invention, the foci F and F' are inverted relative to the observer's head. The back-inverting mirror 5 located in the vicinity of the focus F allows the virtual placing of that part of the central optical path Δ" that is incident on the dioptric surface, and the focus F, in the observer's head. That is to say that the display 1 is virtually placed inside the head 7. Yet in reality the central optical path Δ" originates from the side of the observer's head where the central optical path Δ" was first folded or re-directed by the side fold mirror 4.

It is ascertained that:
- the side fold mirror 4 may now be located more distant from the focus F. The focus F is now directly related to the back-inverting mirror 5. This gives the side fold mirror a much wider range of positioning, and hence of adjustment,
- the ocular dioptric surface 3 is now better adjusted to the morphological profile, curve, of the observer's head in the vicinity of the eye, since the outer profile of the said ocular dioptric surface 3 tends to draw close to the side of the observer's head 7.

In addition, it is noted that:
- the back-inverting mirror 5 is arranged in the vicinity of the upper part of the observer's nose 10 on the pathway of the central optic path Δ" between the side fold mirror and the ocular dioptric surface 3. Therefore the back-inverting mirror 5 can be arranged in an area hidden from the view of the observer, called a "blind spot".
- the side fold mirror 4 is oriented angularly so that the central optic path Δ" of the image is returned or reflected back towards the back-inverting mirror 5 and so that the back-inverting mirror 5 is oriented such that the central optic path Δ" of the image is then returned or reflected towards the ocular dioptric surface 3, the dioptric surface 3 being oriented so that the central optic path Δ" of the image is then returned or reflected towards the observer's eye 6.

In the embodiment in FIG. 4, the device 104 according to the invention is formed of:
- a light display 1;
- lenses 2;
- a side fold mirror 4;
- two decentring mirrors 8 and 9 arranged upstream of the fold mirror 4, so that the they successively reflect the central optic path Δ";
- a back-inverting mirror 5 of planar, convex or concave or aspherical shape;
- an ocular dioptric surface 3 of substantially elliptical shape.

The light display 1 diffuses an image whose pathway is illustrated by a central optic path Δ". The lenses 2 are aligned and centred on the central optic path Δ". The central optic path is then reflected towards the right by the first decentring mirror 8 in the direction of the second decentring mirror 9 which is arranged in the vicinity of the observer's temple. The second decentring mirror 9 then reflects the central path substantially forwardly in the direction of the side fold mirror 4, which then reflects the same towards the right in the direction of the back-inverting mirror 5. The back-inverting mirror 5 is arranged substantially against the upper left part of the observer's nose 10 substantially at the height of the eye 6. The central optic path Δ" is then reflected thereat in the direction of the dioptric surface 3 which reflects it back towards the observer's eye 6. The observer's eye 6 is approximately aligned and centred on the central optical path Δ" in the region of the focus F'.

The device 104 in FIG. 4 differs from the device 103 described with reference to FIG. 3 in that it comprises a set of decentring mirrors 8 and 9. The use of the set of decentring mirrors 8, 9 has the following advantages:
- it allows correction of the adjustment of the angle reflection of the optical path Δ" on the side mirror 4, to offset positioning of the said side fold mirror 4 when it is brought as close as possible to the observer's temple or eye, or as close as possible to the ocular dioptric surface 3, so that it can optionally be integrated therein,
- for this purpose, it allows a device to be produced that is better adapted to the observer's morphology since the pathway of the path Δ" is close to the curve of the observer's head.

In addition, to make the device 103 in FIG. 3 or the device 104 in FIG. 4 more compact, the side fold mirror 4 can be made in a single piece with the ocular dioptric surface 3. Therefore the side fold mirror 4 can be an integral part of the outer end i.e. in the illustrated example of the left end of the ocular dioptric surface 3.

Evidently the invention is not limited to the examples just described.

For example, each of the side fold, reflective, back-inverting and/or decentring mirrors may be planar, concave or convex or substantially aspherical in a manner making it possible to improve the overall quality of the optical system.

Preferably a device of the invention comprises adjustment means, in particular sets of mirror and an ocular dioptric surface capable of adapting the configuration of the device, in particular the optic path, to the observer's morphology.

The invention claimed is:

1. A portable optical device (103, 104) for transmitting an image to an eye (6) of an observer of said image, characterized in that it comprises:
   a display (1) arranged on one side of the observer's head (7) and emitting the image substantially forwardly of said head along an optical path (Δ"), said first side being the same side as said eye (6);
   an ocular dioptric surface (3); and
   redirecting means (4,5; 4,5,8,9) to guide the image between said display and said dioptric surface;
   said device being arranged so that the image originating from the side of the nose in relation to the eye (6) strikes said dioptric surface (3), said dioptric surface (3) then reflecting said image in the direction of said observer's eye (6).

2. The device according to claim 1, wherein,
   said ocular dioptric surface (3) is of substantially elliptic shape, the major axis (Δ) of the ellipse being substantially transverse relative to the observer's head;
   said device being arranged for provision to be made so that the centre of the pupil of said eye (6) is substantially placed on a first focus (F') of the dioptric surface (3), the second focus (F) of the dioptric surface being placed beyond the eye (6) in relation to the first side of the head, in the direction of the second side of the observer's head; and
   redirecting means (4,5; 4,5,8,9) guides the image between said display and said dioptric surface, so that the central optic path is reflected by the dioptric surface (3) substantially backwards, substantially in the direction of the first focus (F').

3. The device according to claim 2, characterized in that it further comprises a least one group of lenses (2) arranged downstream of the display and upstream of the redirecting means (4,5; 4,5,8,9).

4. The device according to claim 2, characterized in that the redirecting means (4,5; 4,5,8,9) comprise a side fold mirror (4) designed to reflect the image transversally in the direction of the second side, and a back-inverting mirror (5) arranged to redirect the image derived from the side fold mirror (4) in the direction of the dioptric surface (3).

5. The device according to claim 4, characterized in that the side fold mirror (4) is an integral part of the dioptric surface (3).

6. The device according to claim 1, characterized in that it further comprises a least one group of lenses (2) arranged downstream of the display and upstream of the redirecting means (4,5; 4,5,8,9).

7. The device according to claim 6, characterized in that the redirecting means (4,5; 4,5,8,9) comprise a side fold mirror (4) designed to reflect the image transversally in the direction of the second side, and a back-inverting mirror (5) arranged to redirect the image derived from the side fold mirror (4) in the direction of the dioptric surface (3).

8. The device according to claim 7, characterized in that the side fold mirror (4) is an integral part of the dioptric surface (3).

9. The device according to claim 1, characterized in that it comprises adjustment means capable of adapting the optical path to the observer's morphology.

10. A portable binocular device, characterized in that it comprises two devices according to claim 1, each for one respective eye of the observer.

11. The device according to claim 1 characterized in that it comprises a carrier structure of eyeglass structure type.

12. The device according to claim 1, characterized in that it comprises a carrier structure of head-set type.

13. A portable optical device (103, 104) for transmitting an image to an eye (6) of an observer of said image, comprising:
   a display (1) arranged on a first side of the observer's head (7) and emitting the image substantially forwardly of said head along an optical path (Δ"), said first side being the same side as the said eye (6);
   an ocular dioptric surface (3); and
   redirecting means (4,5; 4,5,8,9) to guide the image between said display and said dioptric surface,
   said device being arranged so that the image originating from the side of the nose in relation to the eye (6) strikes said dioptric surface (3), said dioptric surface (3) then reflecting said image in the direction of said observer's eye (6), and
   wherein the redirecting means (4,5; 4,5,8,9) comprise a side fold mirror (4) designed to reflect the image transversally in the direction of a second side of the observer's head, and a back-inverting mirror (5) arranged to redirect the image derived from the side fold mirror (4) in the direction of the dioptric surface (3).

14. The device according to claim 13, characterized in that the side fold mirror (4) is an integral part of the dioptric surface (3).

15. The device according to claim 13 characterized in that the back-inverting mirror (5) is designed to position itself in the immediate vicinity of the upper part of the nose (10), substantially at the height of the eye (6), between the eye (6) and the nose (10) of the observer.

16. The device according to claim 13, characterized in that it further comprises two decentring mirrors (8,9) arranged upstream of the side fold mirror (4) the first decentring mirror (8) being arranged so that it laterally reflects the image derived from the display (1) transversally in the direction of the second side of the observer's head, and the second decentring mirror (9) is arranged to reflect the image derived from the first decentring mirror substantially forwardly in the direction of the side fold mirror (4).

17. The device according to claim 16, characterized in that the second decentring mirror (9) is designed to position itself in the vicinity of the temple.

18. The device according to claim 13, characterized in that at least one of the mirrors forming the redirecting means (4,5; 4,5,8,9) has a shape, independently of the shape of another of the mirrors, that is substantially elliptical, planar, concave, convex or aspherical and capable at least of attenuating a distortion of the image seen by the observer.

19. A portable optical device (103, 104) that transmits an image to an eye (6) of an observer of said image, comprising:
   a light display (1) arranged on a first side of the observer's head (7) and located completely behind a front viewing portion of the observer's eyes, the light display originating and emitting the image along an optical path (Δ") directed substantially forwardly of said head and in front of the front viewing portion of the observer's eyes, said first side being a same side as said eye (6);
   an ocular dioptric surface (3) located in front of the front viewing portion of the observer's eyes; and
   a pair of redirecting mirrors (4, 5) located in front of the front viewing portion of the observer's eyes in said optical path (Δ") between the light display and the ocular dioptric surface (3), the redirecting mirrors (4,5) guiding the image in the image optical path (Δ″) exiting said light display to said dioptric surface (3), wherein a first mirror of said pair of redirecting mirrors is a back-inverting mirror (5) located in front of the front viewing portion of the observer's eyes, between the eyes in a region of an upper part of the observer's nose so that the image originating from image display back reflects from on a side of the nose closest to the eye (6) and strikes said dioptric surface (3), said dioptric surface (3) then reflecting said image in the direction of the eye (6).

20. The portable optical device of claim 19, wherein a second mirror of said pair of redirecting mirrors is a side fold mirror (4) that reflect the image transversally in the direction of a second side of the user's head toward the back-inverting mirror (5) arranged to redirect the image derived from the side fold mirror (4) in the direction of the dioptric surface (3).

\* \* \* \* \*